(12) United States Patent
Tremblay et al.

(10) Patent No.: US 6,542,988 B1
(45) Date of Patent: Apr. 1, 2003

(54) SENDING BOTH A LOAD INSTRUCTION AND RETRIEVED DATA FROM A LOAD BUFFER TO AN ANNEX PRIOR TO FORWARDING THE LOAD DATA TO REGISTER FILE

(75) Inventors: Marc Tremblay, Menlo Park, CA (US); Jeffrey Meng Wah Chan, Mountain View, CA (US); Subramania Sudharsanan, Union City, CA (US); Sharada Yeluri, San Jose, CA (US); Biyu Pan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/410,842

(22) Filed: Oct. 1, 1999

(51) Int. Cl.[7] .................................................. G06F 9/38
(52) U.S. Cl. ........................ 712/225; 712/218; 712/219; 712/244
(58) Field of Search ................................ 712/225, 219, 712/218, 244

(56) References Cited

U.S. PATENT DOCUMENTS

| | | | | |
|---|---|---|---|---|
| 4,893,233 A | * | 1/1990 | Denman et al. | ............. 712/219 |
| 5,689,653 A | * | 11/1997 | Karp et al. | ................... 712/222 |
| 5,781,790 A | * | 7/1998 | Abramson et al. | .......... 712/225 |
| 5,903,918 A | | 5/1999 | Bauman et al. | ............. 711/220 |
| 5,905,881 A | * | 5/1999 | Tran et al. | .................... 712/219 |
| 5,987,598 A | * | 11/1999 | Levine et al. | ................ 712/227 |
| 6,336,168 B1 | * | 1/2002 | Frederick et al. | ........... 712/219 |
| 2001/0034827 A1 | * | 10/2001 | Mukherjee et al. | ......... 712/225 |

FOREIGN PATENT DOCUMENTS

| | | | |
|---|---|---|---|
| WO | WO 00/33176 | 6/2000 | |
| WO | WO 0125903 A1 | * 4/2001 | ............. G06F/9/38 |

OTHER PUBLICATIONS

Hennessy and Patterson, Computer Organization & Design The Hardware/Software Interface, 1998, Morgan Kaufmann Publishers, Inc., p. 509.*

* cited by examiner

Primary Examiner—Richard L. Ellis
Assistant Examiner—Tonia Meonske

(57) ABSTRACT

A processor performs precise trap handling for out-of-order and speculative load instructions. It keeps track of the age of load instructions in a shared scheme that includes a load buffer and a load annex. All precise exceptions are detected in a T phase of a load pipeline. Data and control information concerning load operations that hit in the data cache are staged in a load annex during the A1, A2, A3, and T pipeline stages until all exceptions in the same or earlier instruction packet are detected. Data and control information from all other load instructions is staged in the load annex after the load data is retrieved. Before the load data is retrieved, the load instruction is kept in a load buffer. If an exception occurs, any load in the same instruction packet as the instruction causing the exception is canceled. Any load instructions that are "younger" than the instruction that caused the exception are also canceled. The age of load instructions is determined by tracking the pipe stages of the instruction. When a trap occurs, any load instruction with a non-zero age indicator is canceled.

19 Claims, 5 Drawing Sheets

SENDING BOTH A LOAD INSTRUCTION AND RETRIEVED DATA FROM A LOAD BUFFER TO AN ANNEX PRIOR TO FORWARDING THE LOAD DATA TO REGISTER FILE

CROSS-REFERENCE TO RELATED APPLICATION

This application relates to U.S. patent application Ser. No. 09/204,480, filed Dec. 12, 1998, and entitled, "A Multiple-Thread Processor for Threaded Software Applications," and naming Marc Tremblay and William Joy as inventors, the application being incorporated herein by reference in its entirety.

This application relates to U.S. patent application Ser. No. 09/411,824 filed on Oct. 1, 1999, and entitled, "A Method for Facilitating Precise Trap Handling with Speculative and Out-of-Order Loads," and naming Marc Tremblay, Jeffrey Meng Wah Chan, Subramania Sudharsanan, Sharada Yeluri, and Biyu Pan as inventors, the application being incorporated herein by reference in its entirety.

BACKGROUND OF THE INVENTION

1. Field of the Invention

This invention relates to processing, tracking, and managing out-of-order and speculative load instructions in a processor that performs precise trap handling. Specifically, a load buffer and an annex share the data retrieved by a load instruction, and share the functionality of tracking the age of a load instruction and invalidating the load instruction if an earlier-issued instruction causes a precise trap before the load instruction has completed its execution through the Trap pipeline stage.

2. Description of the Related Art

In multiple-thread processing, an automated system for various processing applications may handle multiple events or processes concurrently. A single process is termed a thread of control, or "thread", and is the basic unit of operation of independent dynamic action within the system. A program has at least one thread. A system performing concurrent operations typically has many threads, some of which are transitory and others enduring. Systems that execute among multiple processors allow for true concurrent threads. Single-processor systems can only have illusory concurrent threads, typically attained by time-slicing of processor execution, shared among a plurality of threads.

Some programming languages are particularly designed to support multiple threading. One such language is the Java™ programming language that is advantageously executed using an abstract computing machine, the Java Virtual Machine™. A Java Virtual Machine™ is capable of supporting multiple threads of execution at one time. The multiple threads independently execute Java code that operates on Java values and objects residing in a shared main memory. The multiple threads may be supported using multiple hardware processors, by time-slicing a single hardware processor, or by time-slicing many hardware processors. In 1990 programmers at Sun Microsystems developed a universal programming language, eventually known as "the Java™ programming language". Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

SUMMARY OF THE INVENTION

A method for facilitating precise trap handling for out-of-order and speculative load instructions tracks the age of a load instruction. The age of the load instruction is determined by the current stage of its execution in a sequence of pipeline of stages. The age is tracked in a load buffer age indicator in a load buffer until the information specified in the load instruction is retrieved from a data cache or from main memory. The load buffer age indicator includes a first plurality of bits. In one embodiment, each of the first plurality of bits corresponds to one of the A1, A2, A3, and T pipeline stages.

After the information is retrieved, the information and the load instruction are sent to an annex. The bits in the load buffer age indicator are shifted right by one bit and three of the bits are stored in an annex age indicator. The annex age indicator includes a second plurality of bits. In one embodiment, each of the second plurality of stage bits corresponds to one of the A2, A3, and T pipeline stages.

The method determines when a precise trap has occurred. When a precise trap has occurred, it is determined whether the load instruction was issued before the trapping instruction. Whether the load instruction was issued before the trapping instruction is determined by examining the load buffer age indicator if the data specified in the load instruction has not been retrieved, and by examining the annex age indicator if the data has been received. If the appropriate age indicator indicates that the trapping instruction trapped before the load instruction completed its execution through all pipeline stages, then the load instruction is either the same age or younger than the trapping instruction, and the load instruction is invalidated. In one embodiment, the age of the load instruction is determined by checking whether the appropriate age indicator contains a non-zero value. If the value is non-zero, the load instruction is invalidated upon the occurrence of a precise trap. Invalidation is accomplished by resetting a valid bit in the annex, if the load instruction has been sent to the annex. Otherwise, the invalidation is accomplished by resetting a valid bit associated with the load instruction in the load buffer. Invalidation effectively cancels the load instruction.

Load data—the data specified in the load instruction, is not available for bypass to other functional units until it has been sent to the annex.

In one embodiment a processor is configured to perform the method for precise trap handling for out-of-order and speculative load instructions described above. The processor includes a main memory and a plurality of processing units. It keeps track of the age of load instructions in a shared scheme that includes a load buffer and a load annex. All precise exceptions are detected in a T phase of a load pipeline. Data and control information concerning load operations "that hit in the cache" are staged in a load annex during the A2, A3, and T pipeline stages until all exceptions in the same, or earlier, instruction packet are detected. Data and control information from all other load instructions is staged in the load annex after the load data is retrieved. If an exception occurs, any load in the same instruction packet as the instruction causing the exception is canceled. Any load instructions that are "younger" than the instruction that caused the exception are also canceled. The age of load instructions is determined by tracking the pipe stages of the instruction. When a trap occurs, any load instruction with a non-zero age indicator is canceled.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
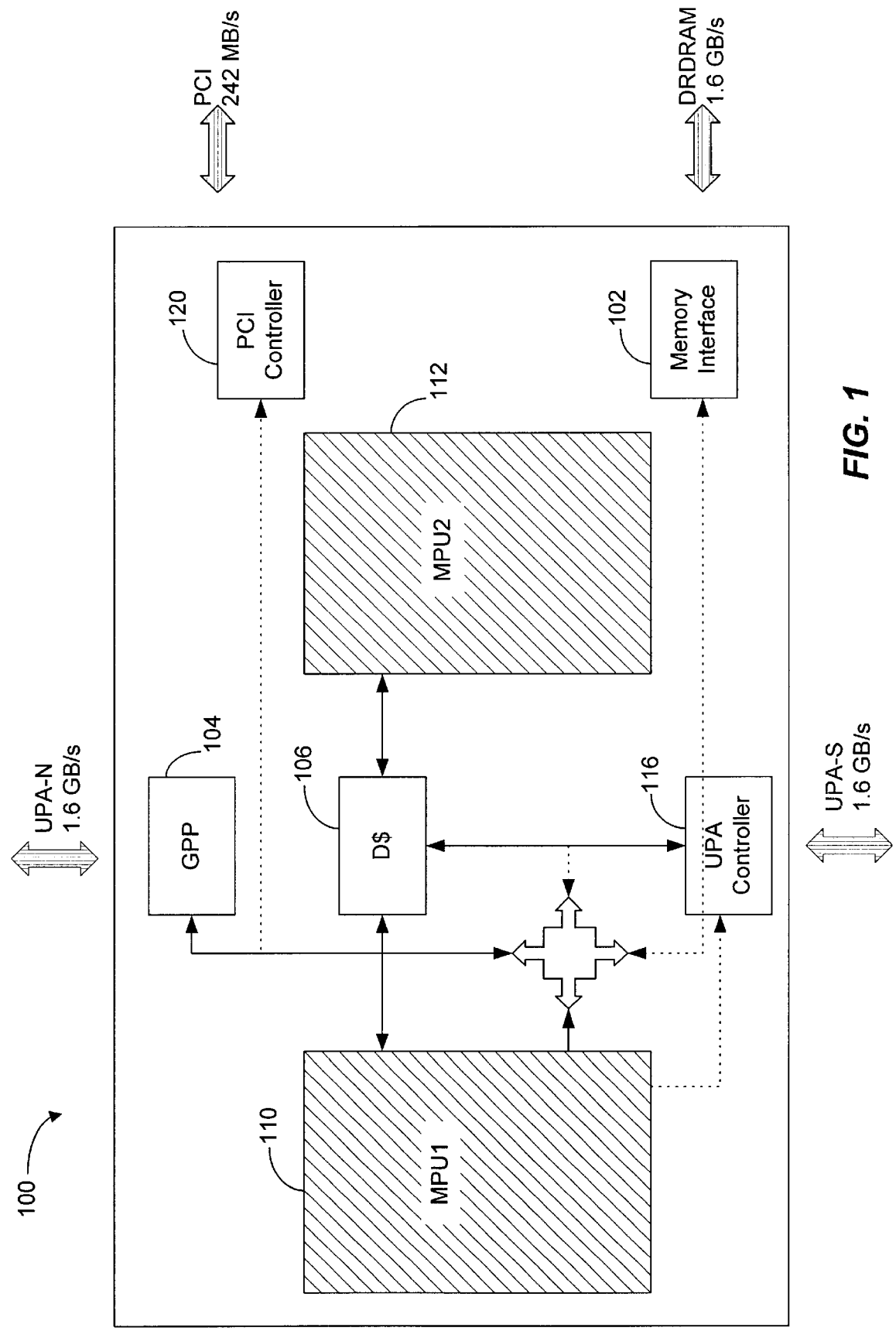
FIG. 1 is a schematic block diagram illustrating one embodiment of a multiple-thread processor.

Referring to FIG. 1, a schematic block diagram illustrates a processor 100 having an improved architecture for multiple-thread operation on the basis of a highly parallel structure including multiple independent parallel execution paths, shown herein as two media processing units 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language generates two threads that respectively execute in the two parallel execution paths with very little overhead incurred. The special instructions executed by the multiple-threaded processor include instructions for accessing arrays, and instructions that support garbage collection.

A single integrated circuit chip implementation of a processor 100 includes a memory interface 102 for interfacing with a main memory, a geometry decompressor 104, the two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The processor 100 issues and retires instructions in order. However, processor 100 implements dynamic instruction rescheduling and speculative execution of load instructions, which allows instructions to execute and complete out of order. Even though the operations may finish out of order, and therefore may generate exceptions out of order, the processor 100 nonetheless provides precise trap handling and maintains the appearance of in-order execution following a trap.

Figure 2:
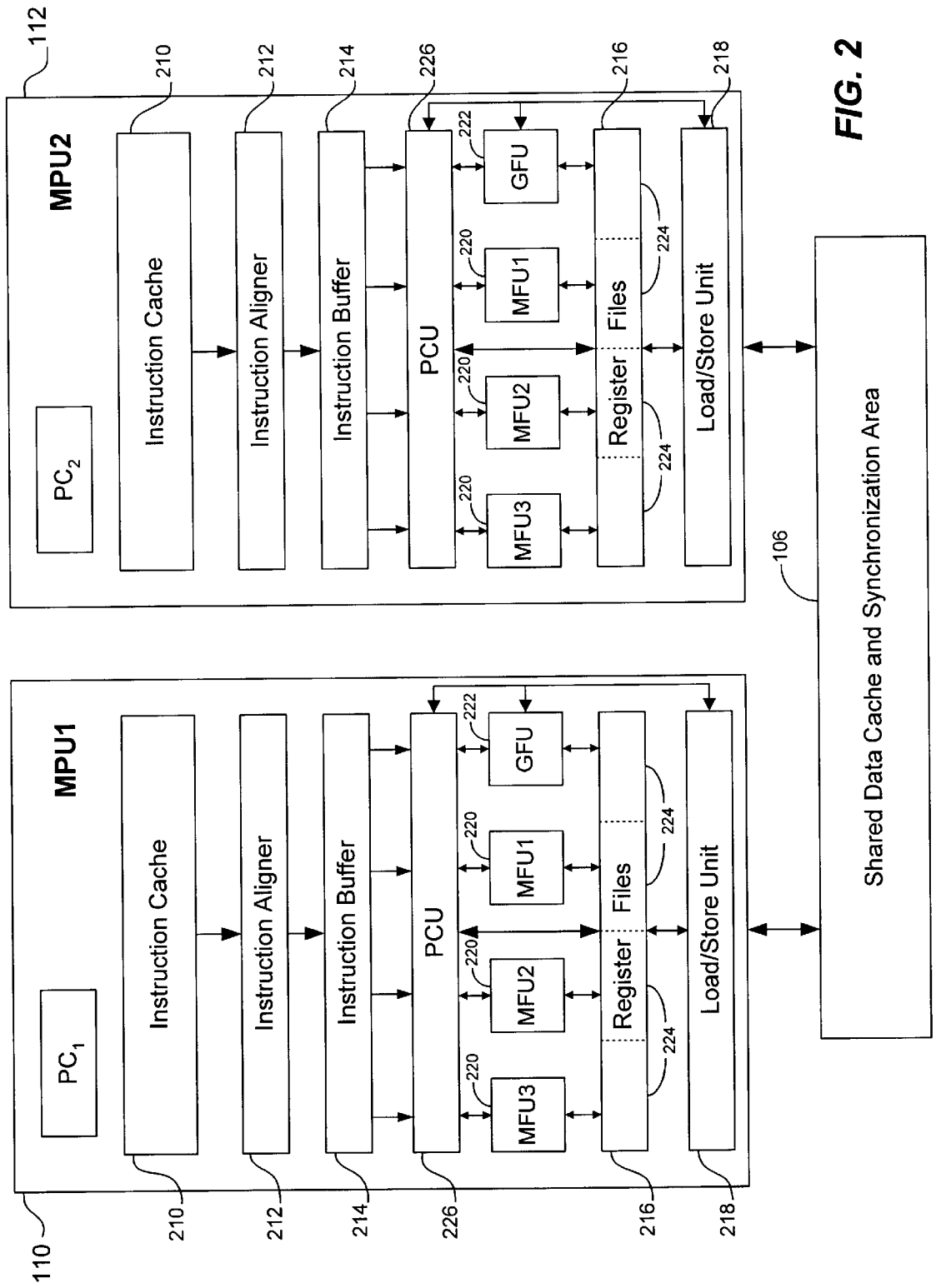
FIG. 2 is a schematic block diagram showing the core of one embodiment of a multi-thread processor.

Referring to FIG. 2, a schematic block diagram shows the core of the processor 100. The media processing units 110 and 112 each include an instruction cache 210, an instruction aligner 212, an instruction buffer 214, a pipeline control unit (PCU) 226, a split register file 216, a plurality of functional units, and a load/store unit 218. In the illustrative processor 100, the media processing units 110 and 112 use a plurality of functional units for executing instructions. The functional units for a media processing unit 110 include three media functional units (MFU) 220 and one general functional unit (GFU) 222.

An individual independent parallel execution path 110 or 112 has operational units including instruction supply blocks and instruction preparation blocks, functional units 220 and 222, and a register file 216 that are separate and independent from the operational units of other paths of the multiple independent parallel execution paths. The instruction supply blocks include a separate instruction cache 210 for the individual independent parallel execution paths, however the multiple independent parallel execution paths share a single data cache 106 since multiple threads sometimes share data. The data cache 106 is dual-ported, allowing data access in both execution paths 110 and 112 in a single cycle. Sharing of the data cache 106 among independent processor elements 110 and 112 advantageously simplifies data handling, avoiding a need for a cache coordination protocol and the overhead incurred in controlling the protocol.

In addition to the instruction cache 210, the instruction supply blocks in an execution path include the instruction aligner 212, and the instruction buffer 214 that precisely format and align a full instruction group of four instructions to prepare to access the register file 216. An individual execution path has a single register file 216 that is physically split into multiple register file segments 224, each of which is associated with a particular functional unit of the multiple functional units. At any point in time, the register file segments as allocated to each functional unit each contain the same content. A multi-ported register file is typically metal limited to the area consumed by the circuit which is proportional with the square of the number of ports. The processor 100 has a register file structure divided into a plurality of separate and independent register files to form a layout structure with an improved layout efficiency. The read ports of the total register file structure 216 are allocated among the separate and individual register files. Each of the separate and individual register files has write ports that correspond to the total number of write ports in the total register file structure. Writes are fully broadcast so that all of the separate and individual register files are coherent.

The media functional units 220 are multiple single-instruction-multiple-data (MSIMD) media functional units. Each of the media functional units 220 is capable of processing parallel 16-bit components. Various parallel 16-bit operations supply the single-instruction-multiple-data capability for the processor 100 including add, multiply-add, shift, compare, and the like. The media functional units 220 operate in combination as tightly coupled digital signal processors (DSPs). Each media functional unit 220 has a separate and individual sub-instruction stream, but all three media functional units 220 execute synchronously so that the subinstructions progress lock-step through pipeline stages.

During operation of the processor 100, traps may occur. A trap is a vectored transfer of control to privileged software, taken by the processor 100 in response to the presence of certain conditions. Traps may occur due to internal events or external events. An external condition that will cause a trap is an interrupt. An interrupt is a request for service presented to the functional unit by a device external to the functional unit. An interrupt is asynchronous to the instruction stream of the functional unit receiving the interrupt. Internally, a trap may occur due to an exception. An exception is triggered by the execution of an instruction within the functional unit. An exception is a condition that makes it impossible for a functional unit to continue executing the current instruction stream without software intervention. The functional unit may be set to ignore some exceptions. If, however, the functional unit has not been set to ignore an exception, or if the exception is of a type that must not be ignored, then the exception will cause a trap.

One specific type of trap is a "precise" trap, which is generated by an attempt to execute an instruction. An instruction may generate an exception it if encounters some condition that makes it impossible to complete normal execution. Such an exception may, in turn, generate a precise trap. It is induced by a particular instruction and occurs before any program-visible state of the processor 100 has been changed by the trap-inducing instruction. For load instructions, this means that the trap occurs before the results of the trap-inducing load are written to the register file.

When instructions are generated for processor 100, either by hand or by compiler, the instructions are organized into packets of instructions. The instruction packet may contain from one to N instructions, where N is the number of functional units included in the media processing units 110, 112. In at least one embodiment, the instruction packets include four instructions. Each instruction packet either executes to completion or causes an exception.

If any instruction generates a recoverable error, the processor 100 provides precise trap handling by returning to its machine state at the time the exception occurred, and resuming operation. When a precise trap occurs, the processor 100 ensures a precise state by completing execution of all instruction packets issued before the one that induced the trap. In addition, the processor 100 prevents all instruction packets that issued after the one that induced the trap from completing execution, even if they finished out-of-order before the trap-inducing instruction. The processor 100, therefore, restores itself to its state at the time of the exception. After such restoration, execution may be resumed. Operation may either be resumed from the trapping instruction or from the instruction following the trapping instruction. In this manner the processor 100 provides that instructions that finish out of order with respect to other packet instructions, or other packets, and then generate an exception, will nonetheless allow the processor 100 to resume operation at a precise state, as long as the error is a recoverable error (i.e., the error does not prevent restoration of the exception-time machine state).

Figure 3:
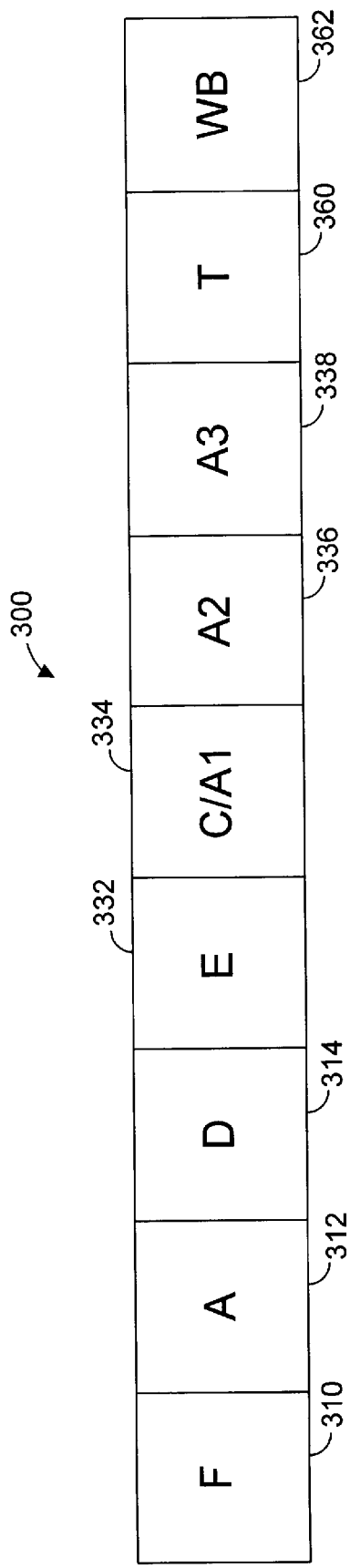
FIG. 3 is a schematic timing diagram illustrating one embodiment of a dedicated load/store pipeline.

On the other hand, the processor 100 cannot perform precise trap handling for catastrophic errors. Catastrophic errors are a class of errors that occur due to a hardware malfunction from which, due to the nature of the error, the state of the machine at the time of the exception cannot be restored. Since the machine state cannot be restored, execution after an exception caused by a catastrophic error may not be resumed. An example of such a catastrophic error is an uncorrectable bus parity error. FIG. 3 is relevant to a discussion of precise trap handling for load instructions, it being understood that the load instructions may be scheduled speculatively and may also be scheduled to execute out of order. Processor 100 maintains a dedicated load/store pipe 300 for processing load and store memory operations. FIG. 3 is a schematic timing diagram illustrating one embodiment of the dedicated load/store pipe 300. The load/store pipe 300 includes nine sequential stages, including three initiating stages, a plurality of execution stages, and two terminating stages.

Referring to FIGS. 2 and 3, the operation of the GFU load/store pipe 300 is controlled by the Pipe Control Unit (PCU) 226. The first of the initiating stages of the load/store pipeline 300 is a fetch stage 310 (F stage). During the F stage 310, the processor 100 fetches instructions from the instruction cache 210. The fetched instructions are aligned in the instruction aligner 212 and forwarded to the instruction buffer 214 during an align stage 312 (A stage), a second stage of the initiating stages.

In a third stage of the initiating stages, decoding stage 314 (D stage), the PCU 226 decodes the fetched and aligned instruction out of the instruction packet. During the D stage 314 the PCU 226 sends information concerning the current load instruction to the LSU 219. The four register file segments 224 each hold either floating-point data or integer data. The register file 216 is read in the decoding (D) stage 314.

Also during the D stage 314, the scoreboard (not shown) is read and updated. The scoreboard is a structure with information concerning unfinished loads. It provides a hardware interlock between any unfinished load operation and a younger instruction that has data/output dependency with the unfinished load operation. When a new instruction enters the D stage 314, it compares its source and destination register operands with all of the scoreboard entries. The number of entries in the scoreboard allocated for unfinished loads is equal to the number of entries in the load buffer 400 (FIG. 4) of the LSU, described below. In at least one embodiment, the scoreboard contains 5 load instruction entries. Each scoreboard entry for a load instruction has a 5-bit stage field that indicates how old the unfinished instruction is. This stage field is similar to the load buffer status word 410 (FIG. 4) discussed below. The stage bits are shifted right by one position as each pipeline stage executes. If a trap is detected before the load instruction's stage field indicates the WB stage (1B'0000'), then the scoreboard entry is invalidated.

Following the decoding stage 314, the execution stages are performed. In the first execution stage, the E stage 332, the GFU 222 calculates the address of each load and store instruction. Also during the E stage 332, all load and store instructions in the instruction packet are sent to the load/store unit (LSU) 218 for execution.

Figure 4:
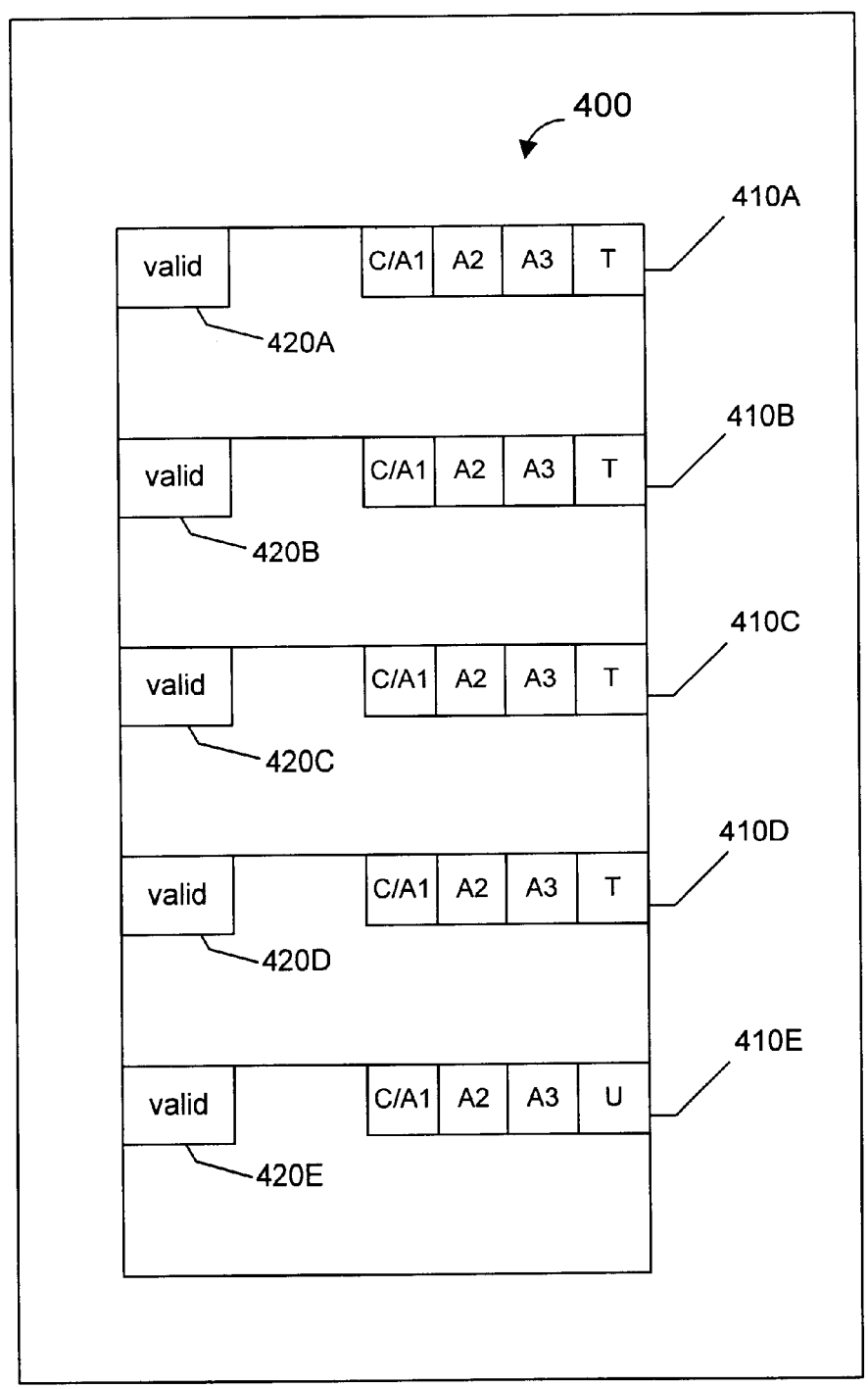
FIG. 4 is a block diagram of at least one embodiment of a load/store unit.

Referring to FIGS. 3 and 4, processing of load instructions during the remaining pipeline stages 334, 336, 338, 360, 362 is handled as follows. From the E stage 332 forward to the T stage 360, the LSU 218 keeps track of the load instruction's age. When forwarded to the LSU 218 in the E stage, the load instructions are placed into the load buffer 400 of the LSU. In at least one embodiment, the load buffer 400 has five entries and is therefore capable of maintaining up to five load instructions. Five entries are required because, in at least one embodiment, processor 100 allows one hit under four misses (described immediately below). In order to achieve this, 5 load entries are supported in the load buffer 400, and five load entries are supported by the scoreboard, described above.

Regarding a "hit under miss," reference is made to FIG. 2. When the LSU 218 attempts to access an item of information requested in a load operation, the item is either already present in the data cache 106 or not. If present, a cache "hit" has occurred. If the item is not in the data cache 106 when requested by the LSU 218, a cache "miss" occurs. After a cache miss occurs, the information requested by the LSU 218 must then be retrieved from memory and brought into the data cache 106 so that it may be accessed by the LSU 218. This search for an item of information that is not stored in the data cache 106 after a cache miss is a relatively time-consuming process. Processor 100 allows for a later-submitted load instruction that "hits" to obtain information from the data cache 106 before an earlier submitted load instruction that suffers a cache miss. This situation is referred to as a "hit under miss".

Referring to FIGS. 3 and 4, we return to our discussion of load instruction processing during the execution stages of the load/store pipe 300. Along with each load instruction, the LSU 218 keeps track of whether or not the instruction is valid and the load instruction's pipeline age. The valid bit 420 indicates that the load instruction has not been canceled due to a trap. In other words, resetting the valid bit effectively cancels the load instruction. The age information is kept in a status word 410. Each status word 410A, 410B, 410C, 410D, 410E includes four stage bits, each stage bit corresponding to one of the C/A1, A2, A3, or T pipeline stages. The LSU detects the transition from one pipeline stage to the next and, upon each transition, shifts the stage bits to the right by one position. The age of a load instruction is tracked in the status word 410 as indicated below in Table 1.

TABLE 1

| Stage Bits | C | A2 | A3 | T |
|---|---|---|---|---|
| C stage  | 1 | 0 | 0 | 0 |
| A2 stage | 0 | 1 | 0 | 0 |
| A3 stage | 0 | 0 | 1 | 0 |
| T stage  | 0 | 0 | 0 | 1 |

The LSU 218 accesses the data cache 106 in the C/A1 stage 334 of the load/store pipeline 300. If the load hits the data cache 106, data returns from the data cache 106 and is forwarded to the PCU 226 in the same cycle. The LSU 218 also sends to the PCU 226 the status word 410 with the age of the load. In the case where the load hits the data cache 106 in the C/A1 Stage 334, the status word will reflect a value of 1B'1000', indicating that the age of the load corresponds to the C/A1 pipeline stage 334. On such a cache hit, load data returns to the PCU 226 during the same C/A1 stage 334 that the LSU 218 accessed the data cache 106. However, in order to ensure precise trap handling, the results from the hit cannot be written to the register file 216 until all other instructions in the instruction packet have completed. When a load hits in the C/A1 stage 334, its resultant data cannot be written to the register file 216 until the remaining execution stages have completed.

If the load misses the data cache 106, the data returns from the LSU 218 to the PCU 226 only after the LSU 218 gets the data either from the main memory interface 102 (FIG. 1). Thus, a load instruction remains in the load buffer of the LSU 218 until it retrieves its data. In contrast, all load instructions and their retrieved data are transferred to the LDX 500 after the data has been retrieved. In this manner, the load buffer 400 and LDX 500 share functionality in terms of tracking the age of load instructions and invalidating "younger" instructions when an "older" instruction traps. This functionality is further described below and generally involves resetting, during the T stage 360, a valid bit associated with any load instruction in the same instruction packet as trapping instruction, as well as resetting a valid bit for all other load instructions that are "younger" than the trapping instruction.

Figure 5:
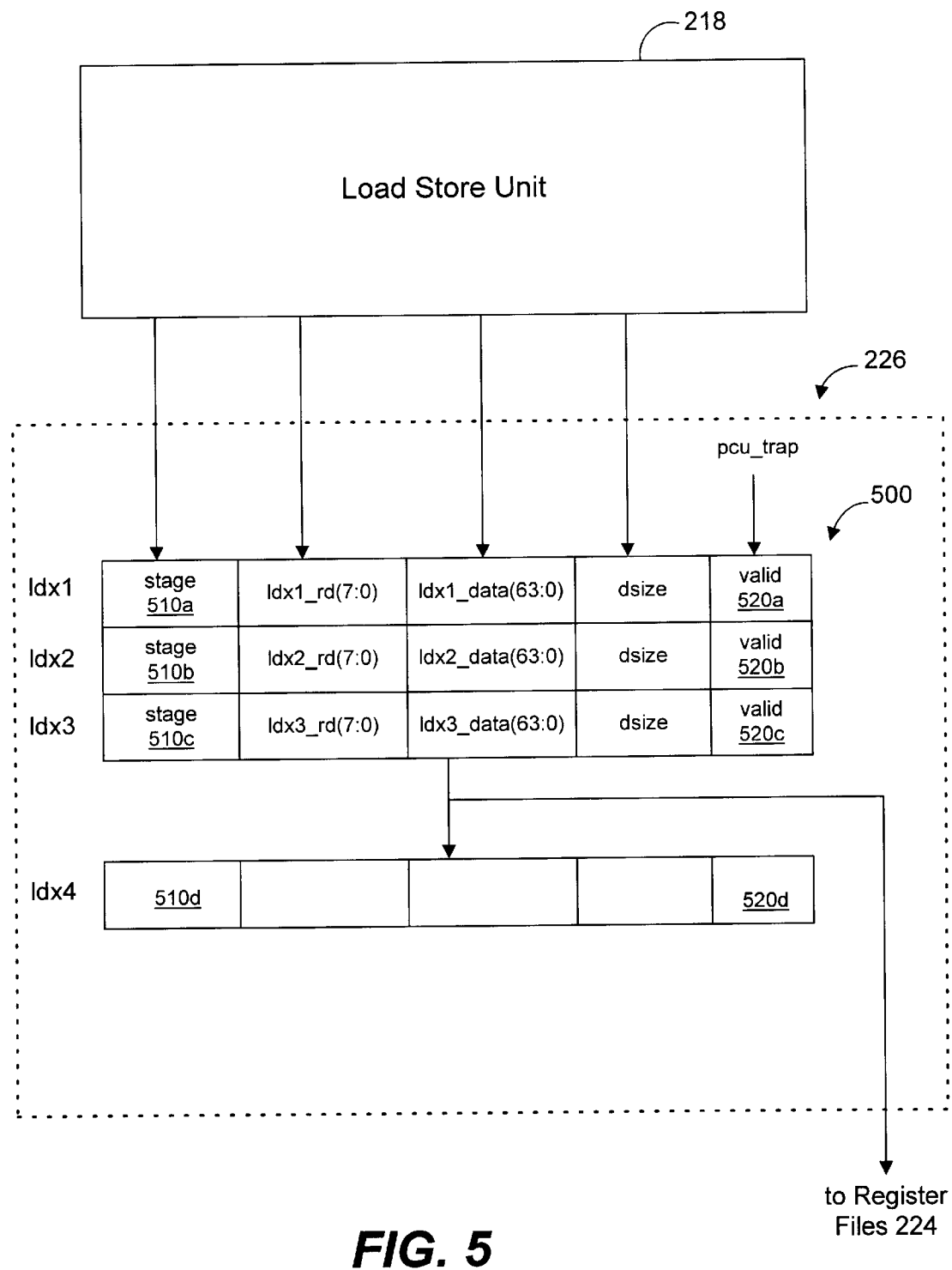
FIG. 5 is a schematic diagram illustrating a load/store unit and a pipe control unit that share information concerning load instructions.

Referring to FIG. 5, after it is received after load data is received by the PCU 226, it is not immediately written to the register files 224. To do so might cause data incoherence in a machine that executes load instructions speculatively and out of order. Instead, the load data and associated load information enters a load annex (LDX) 500. Load data is staged in the LDX 500 for a sufficient number of cycles so that the load instruction can reach the T pipeline stage before its data is broadcast to the register files 224. While load data is being staged in the LDX 500, the data is available to be bypassed to other functional units. The load data is broadcast to the register files in the T stage 360 if is no trap was detected. Traps are detected in the T pipeline stage 360 (FIG. 3).

In at least one embodiment, the load data is staged in the LDX 500 for three stages before being broadcast to the register files 224. By staging the load data in the LDX 500 for three cycles, all the precise exceptions caused by either the load instruction itself or other instructions in the same or an older instruction packet as the load instruction will cause the load instruction to be canceled. That is, if a trap is detected before the load instruction reaches the WB stage 362, the valid bit for the load instruction is reset. When the load data is broadcast to the register files 224, the register files 224 latch the data locally and update the registers in the next clock cycle.

FIG. 5 illustrates that LDX 500 contains four entries labeled ldx1, ldx2, ldx3, and ldx4. These LDX entries act as a FIFO queue, with newer load data from the LSU 218 being placed in ldx1, and older load data being written to the register files 224 from ldx4. The registers 224 have a dedicated write port for load instructions, so the load data is shifted down one entry in the FIFO LDX 500 each clock cycle.

FIG. 5 illustrates that the LDX 500 includes four entries ldx1, ldx2, ldx3, ldx4 even though the load data is only staged for three cycles. The fourth entry ldx4 is used to write the load data to the register files 224. Because load data cannot be accessed in the same cycle that it is being written to the register files 224, the additional ldx4 entry holds the load data while it is being written.

Each LDX entry ldx1, ldx2, ldx3, ldx4 includes a stage field 510. This stage field 510 is derived from the value of the load buffer status word 410 associated with the LDX entry when it enters the PCU 226. The value of the stage field 510 indicates the age of the load instruction in the LDX entry. When the status word 410 for a particular load instruction is forwarded to the LDX 500, the C/A1 stage is no longer relevant. Instead, the load data was received by the LDX 500, at the earliest, during the C/A1 phase, so the LDX 500 need only track the age of the particular load instruction through the A2, A3, and T stages to ensure that the data from one-cycle load instructions that hit in the data cache 106 are not written to the register files 224 until the particular load instruction has completed the T stage. The stage bits in the four-bit status word 410 for the particular load instruction are therefore shifted right by one bit and the stage bits corresponding to the A2, A3, and T stages are placed in the 3-bit stage field 510 of the LDX entry associated with the particular load instruction. The PCU 226 detects the transition from one pipeline stage to the next. Upon each such transition, the PCU 226 shifts the stage bits in the stage field 510 to the right by one bit position. Because only one stage bit, at the most, is set for a load instruction at any one time, shifting to the right effectively resets the stage bit for the last stage and sets the stage bit for the current stage. The values of the stage field 510 for each pipeline stage that the LDX tracks is set forth below in Table 2.

TABLE 2

| Stage | Description |
| --- | --- |
| 1B'100' | Load data in A2 stage |
| 1B'010' | Load data in A3 stage |
| 1B'001' | Load data in T stage |
| 1B'000' | Load data in WB or after WB stage |

Table 2 illustrates that the sequential shift-right scheme for each successive transition from one pipeline stage to the other has the effect that all stage bits are reset for the WB stage 362 and any stages that occur after the load instruction has reached its WB stage 362. If a trap is detected before a load instruction reaches the WB stage 362, the load instruction is invalidated. In at least one embodiment, the valid bit 520 in the LDX entry is reset by the pcu_trap signal that indicates that the PCU 226 has detected a trap.

Each LDX entry ldx1, 1dx2, ldx3, ldx4 also includes a size field. The size field indicates whether the data associated with the load instruction is a 64-bit data word or a 32-bit data word.

The next two execution stages following the C/A1 stage 334, the A2 stage 336 and the A3 stage 338, are additional execution stages. For load instructions that have accessed the data cache 106 and returned their data during the C/A1 stage 334, the data is staged in the LDX 500 during the A2 and A3 stages 336, 338. The presence of trap conditions are detected by the PCU 226 in the T stage 360 of the load/store pipeline 300.

FIG. 3 illustrates that the two terminating stages of the load/store pipe 300 include a trap-handling stage 360 (T stage) and a write-back stage 362 (WB stage) during which result data is written-back to the register file 216. Processing of a load instruction during each of these stages is discussed in detail below.

FIG. 5 illustrates that, if the PCU 226 detects a trap, it generates a trap signal pcu_trap. This signal is used during the T stage 360 to reset the "valid" bit in the LDX entries for load instructions that are younger than the trapping instructions. In addition, the PCU 226 sends the pcu_trap signal to the LSU 218, and the LSU 218 then resets its valid bits 420A, 420B, 420C, 420D, 420E for any load instructions in the load buffer 400 that are younger than the trapping instruction. In the LDX 500, the load instruction will only be invalidated if it has not reached the WB 362 stage by the time the trap is detected. In other words, any load instruction that has reached the WB 362 stage may be written to the register files 224, regardless of its age, since it obviously was not canceled before or during the trap stage of its pipeline.

The LSU 218 and PCU 226 determine whether a load instruction is "younger" than a trapping instruction as follows. The LDX stage field 510 and the load buffer status word 410 each keep track of the age of a load instruction. The LDX 500 will at the earliest, receive the load instruction one cycle after the LSU 218 receives it; the stage field 510 has one less bit than the status word 410 as the PCU 226 keeps track of one less stage. As Table 1 and Table 2, above, demonstrate, the status word 410 and stage field 510 will always have a non-zero value until the load instruction reaches the WB stage 362. The PCU 226 and LSU 218 therefore determine that a load instruction is "younger" than the trapping instruction if the age of a load instruction is non-zero since traps are detected in the T 360 stage.

In the LDX 500, the PCU 226 resets the valid bit 520 for any LDX entry ldx1, ldx2, ldx3 whose stage field 510 is non-zero. In at least one embodiment, for a trap that occurs in cycle N, the valid bit 520 is reset before the LDX entries ldx1, ldx2, ldx3 are shifted down in cycle N+1. In the PCU 226, then, a value of all zeros in the stage field 510 indicates that the load data is safe to broadcast to the register files 224 because it has proceeded past the T stage 360 and has at least reached the WB stage 362

In the LSU 218, a status word 410 value of all zeroes means that a cache miss has occurred over a relatively long time. Only load instructions that have missed the cache or have otherwise not retrieved their data remain in the load buffer; cache hits and load instructions that have retrieved data from the memory interface 102 are sent to the LDX 500 as described above. All zeros in the status word 410 for a load instruction in the load buffer 400 means, then, that a miss has occurred while the load instruction's pipeline stages completed to, or past, the WB stage 362. In this case, the load instruction need not be canceled, since it is older than the trapping instruction. In contrast, the LSU 218 cancels any load that has a non-zero value in its status word 410 when the LSU 218 receives the pcu_trap indicator from the PCU 226.

During the WB stage 362, data from the T stage 360 of the load store/store pipeline 300 is broadcast to the register files 224. The register files 224 latch the data in WB-stage flip-flop latches (not shown) before writing the data.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for sharing load instruction processing in a processor that includes a load buffer and an annex and that facilitates precise exception handling for out-of-order and speculative load instructions, comprising:
   tracking an age of a load instruction with a load buffer age indicator in a load buffer,
   wherein the load buffer age indicator comprises a first plurality of stage bits;
   determining whether data specified in the load instruction has been retrieved;

if the data specified in the load instruction has been retrieved, sending from the load buffer to an annex the load instruction, the data that has been retrieved, and the load buffer age indicator;

formatting the first plurality of stage bits into an annex age indicator if the data specified in the load instruction has been retrieved, wherein the annex age indicator comprises a second plurality of stage bits;

tracking the age of the load instruction with the annex age indicator in the annex, if the data specified in the load instruction has been retrieved;

detecting that a second instruction has caused a precise trap to occur;

determining, when the precise trap has occurred, whether the load instruction was issued before the second instruction; and invalidating the load instruction when the precise trap has occurred and the load instruction was not issued before the second instruction.

2. The method recited in claim 1, wherein:

the load instruction is executed during a plurality of sequential pipeline stages;

each of the first plurality of stage bits corresponds to a different one of the sequential pipeline stages included in the plurality of sequential pipeline stages; and each of the second plurality of stage bits corresponds to a different one of the sequential pipeline stages included in the plurality of pipeline stages.

3. The method recited in claim 2, wherein:

the plurality of pipeline stages comprises a first pipeline stage, a second pipeline stage, a third pipeline stage, and a fourth pipeline stage;

the first plurality of stage bits includes a first stage bit that corresponds to the first pipeline stage, a second stage bit that corresponds to the second pipeline stage, a third stage bit that corresponds to the third pipeline stage, and a fourth stage bit that corresponds to the fourth pipeline stage; and the second plurality of stage bits includes a fifth stage bit that corresponds to the second pipeline stage, a sixth stage bit that corresponds to the third pipeline phase, and a seventh stage bit that corresponds to the fourth pipeline stage.

4. The method recited in claim 3, wherein the tracking an age of a load instruction with a load buffer age indicator comprises:

setting the first stage bit when the execution of the load instruction has entered the first pipeline stage;

detecting a first transition when the execution of the load instruction moves from the first pipeline stage to the second pipeline stage;

when the first transition is detected, resetting the first stage bit and setting the second stage bit;

detecting a second transition when the execution of the load instruction moves from the second pipeline stage to the third pipeline stage;

when the second transition is detected, resetting the second stage bit and setting the third stage bit;

detecting a third transition when the execution of the load instruction moves from the third pipeline stage to the fourth pipeline stage;

when the third transition is detected, resetting the third stage bit and setting the fourth stage bit;

detecting a fourth transition when the execution of the load instruction moves from the fourth pipeline stage; and when the fourth transition is detected, resetting all of the bits that comprise the first plurality of stage bits.

5. The method recited in claim 3, wherein the tracking the age of the load instruction with the annex age indicator comprises:

setting the fifth stage bit when the execution of the load instruction has entered the second pipeline stage;

detecting a first transition when the execution of the load instruction moves from the second pipeline stage to the third pipeline stage;

when the first transition is detected, resetting the fifth stage bit and setting the sixth stage bit;

detecting a second transition when the execution of the load instruction moves from the third pipeline stage to the fourth pipeline stage;

when the second transition is detected, resetting the sixth stage bit and setting the seventh stage bit;

detecting a third transition when the execution of the load instruction moves from the fourth pipeline stage; and when the third transition is detected, resetting all of the bits that comprise the second plurality of stage bits.

6. The method of claim 1 wherein the determining whether the load instruction was issued before the second instruction further comprises:

if the data specified in the load instruction has been retrieved, determining whether the annex age indicator contains a non-zero value; and if the data specified in the load instruction has not been retrieved, determining if the load buffer age indicator contains a non-zero value.

7. The method recited in claim 1 wherein the invalidating further comprises:

if the data specified in the load instruction has been retrieved, resetting a valid bit associated with the load instruction in the annex; and if the data specified in the load instruction has not been retrieved, resetting a valid bit associated with the load instruction in the load buffer.

8. The method recited in claim 1 further comprises:

making the information specified in the load instruction available for bypass from the annex, after the sending from the load buffer to the annex.

9. A computer system that provides shared annex and load buffer processing for precise exception handling for out-of-order and speculative load instructions, comprising:

a main memory;

a plurality of processing units coupled to the main memory;

a load buffer means for tracking an age of a load instruction with a load buffer age indicator where the load buffer age indicator is included in a load buffer, wherein the load buffer age indicator comprises a first plurality of stage bits and wherein the load buffer means for tracking is coupled to the plurality of processing units;

a means for determining whether data specified in the load instruction has been retrieved, wherein the means for determining is coupled to the plurality of processing units;

a means for sending, if the data specified in the load instruction has been retrieved, from the load buffer to an annex the load instruction, the data that has been retrieved, and the load buffer age indicator, wherein the means for sending is coupled to the plurality of processors;

a means for formatting the first plurality of stage bits into an annex age indicator if the data specified in the load instruction has been retrieved, wherein the means for formatting is coupled to the plurality of processors;

an annex means for tracking the age of the load instruction with an annex age indicator where the annex age indicator is included in the annex, wherein the annex age indicator comprises a second plurality of stage bits and wherein the annex means for tracking is coupled to the plurality of processing units;

a means for detecting that a second instruction has caused a precise trap to occur;

a means for deciding, when the precise trap has occurred, whether the load instruction was issued before the second instruction; and a means for invalidating the load instruction when the precise trap has occurred and the load instruction was not issued before the second instruction.

10. The computer system recited in claim 19, wherein:

the load instruction is executed during a plurality of sequential pipeline stages;

each of the first plurality of stage bits corresponds to a different one of the sequential pipeline stages included in the plurality of sequential pipeline stages; and each of the second plurality of stage bits corresponds to a different one of the sequential pipeline stages included in the plurality of pipeline stages.

11. The computer system recited in claim 10, wherein:

the plurality of sequential pipeline stages comprises a first pipeline stage, a second pipeline stage, a third pipeline stage, and a fourth pipeline stage;

the first plurality of stage bits includes a first stage bit that corresponds to the first pipeline stage, a second stage bit that corresponds to the second pipeline stage, a third stage bit that corresponds to the third pipeline stage, and a fourth stage bit that corresponds to the fourth pipeline stage; and the second plurality of stage bits includes a fifth stage bit that corresponds to the second-pipeline stage, a sixth stage bit that corresponds to the third pipeline phase, and a seventh stage bit that corresponds to the fourth pipeline stage.

12. The computer system recited in claim 11, wherein the load buffer means for tracking further comprises:

a means for setting the first stage bit when the execution of the load instruction has entered the first pipeline stage;

a means for detecting a first transition when the execution of the load instruction moves from the first pipeline stage to the second pipeline stage;

a means for resetting the first stage bit and setting the second stage bit when the first transition is detected;

a means for detecting a second transition when the execution of the load instruction moves from the second pipeline stage to the third pipeline stage;

a means for resetting the second stage bit and setting the third stage bit when the second transition is detected;

a means for detecting a third transition when the execution of the load instruction moves from the third pipeline stage to the fourth pipeline stage;

a means for resetting the third stage bit and setting the fourth stage bit when the third transition is detected;

a means for detecting a fourth transition when the execution of the load instruction moves from the fourth pipeline stage; and a means for resetting all of the bits that comprise the first plurality of stage bits when the fourth transition is detected.

13. The computer system recited in claim 11, wherein the annex means for tracking further comprises:

a means for setting the fifth stage bit when the execution of the load instruction has entered the second pipeline stage;

a means for detecting a first transition when the execution of the load instruction moves from the second pipeline stage to the third pipeline stage;

a means for resetting the fifth stage bit and setting the sixth stage bit when the first transition is detected;

a means for detecting a second transition when the execution of the load instruction moves from the third pipeline stage to the fourth pipeline stage;

a means for resetting the sixth stage bit and setting the seventh stage bit when the second transition is detected;

a means for detecting a third transition when the execution of the load instruction moves from the fourth pipeline stage; and a means for resetting all of the bits that comprise the second plurality of stage bits when the third transition is detected.

14. The computer system recited in claim 9 wherein the means for deciding whether the load instruction was issued before the second instruction further comprises:

a means for determining, if the data specified in the load instruction has been retrieved, whether the annex age indicator contains a non-zero value; and a means for determining, if the data specified in the load instruction has not been retrieved, whether the load buffer age indicator contains a non-zero value.

15. The system recited in claim 9 wherein the means for invalidating further comprises:

a means for resetting a valid bit associated with the load instruction in the annex, if the data specified in the load instruction has been retrieved; and a means for resetting a valid bit associated with the load instruction in the load buffer, if the data specified in the load instruction has not been retrieved.

16. An apparatus that provides shared annex and load buffer processing for precise exception handling for out-of-order and speculative load instructions, comprising:

a main memory;

a plurality of processing units coupled to the main memory;

a load buffer coupled to the plurality of processing units, the load buffer being configured to retrieve load data specified in the load instruction;

a load buffer age indicator, where the load buffer age indicator is included in the load buffer, the load buffer age indicator comprising a first plurality of stage bits that correspond to a plurality of sequential pipeline stages, wherein each of the stage bits comprising the first plurality of stage bits corresponds to a different one of the sequential pipeline stages;

an annex that is configured to receive from the load buffer the load data and the load instruction when the load data has been retrieved by the load buffer;

an annex age indicator, where the annex age indicator is included in the annex, the annex age indicator comprising a second plurality of stage bits that correspond to the plurality of sequential pipeline stages, wherein each of the stage bits comprising the second plurality of stage bits corresponds to a different one of the sequential pipeline stages.

17. A method for sharing load instruction processing in a processor that includes a load buffer and an annex, comprising:

determining whether data specified in a load instruction has been retrieved into a load buffer;

if the data specified in the load instruction has been retrieved, sending from the load buffer to an annex the load instruction and the data that has been retrieved;

making the data that has been retrieved available for bypass from the annex to one or more functional units; and providing the data that has been retrieved to a register file.

18. The method, recited in claim 17, wherein the load instruction is included in a plurality of load instructions and the processor provides a plurality of clock cycles; the method further comprising:

determining whether data specified in one of the plurality of load instructions has been retrieved into a load buffer;

if the data specified in one of the plurality of load instructions has been retrieved, sending from the load buffer to an annex the one of the plurality of load instructions and the data that has been retrieved, the annex being capable of receiving only one load instruction and only one data that has been retrieved during each of the plurality of clock cycles, the annex being capable of storing one or more of the plurality of load instructions and also being capable of storing one or more data that has been retrieved.

19. The method, recited in claim 18, wherein the annex provides one data that has been retrieved to the register file during each of the plurality of clock cycles.

* * * * *

UNITED STATES PATENT AND TRADEMARK OFFICE
CERTIFICATE OF CORRECTION

PATENT NO.    : 6,542,988 B1
DATED         : April 1, 2003
INVENTOR(S)   : Marc Tremblay et al.

It is certified that error appears in the above-identified patent and that said Letters Patent is hereby corrected as shown below:

Column 13,
Line 19, "recited in claim 19" should read -- recited in claim 9 --.

Signed and Sealed this

Twenty-second Day of June, 2004

JON W. DUDAS
*Acting Director of the United States Patent and Trademark Office*